United States Patent
Brooks

(10) Patent No.: US 9,854,899 B2
(45) Date of Patent: *Jan. 2, 2018

(54) ROTARY GROUND AUGER BASE AND STAND FOR SUPPORTING ARTICLES

(71) Applicant: Kevin Brooks, Leitchfield, KY (US)

(72) Inventor: Kevin Brooks, Leitchfield, KY (US)

(73) Assignee: Decoy Stake Solutions, LLC, Leitchfield, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/999,498

(22) Filed: Feb. 25, 2016

(65) Prior Publication Data

US 2016/0360869 A1     Dec. 15, 2016

Related U.S. Application Data

(63) Continuation-in-part of application No. 14/121,469, filed on Sep. 9, 2014, now Pat. No. 9,316,016, which
(Continued)

(51) Int. Cl.
| | |
|---|---|
| *A45F 3/44* | (2006.01) |
| *E04H 12/22* | (2006.01) |
| *G03B 17/56* | (2006.01) |
| *F16M 11/28* | (2006.01) |
| *F16M 11/24* | (2006.01) |

(Continued)

(52) U.S. Cl.
CPC ............... *A45F 3/44* (2013.01); *A01M 31/06* (2013.01); *E04H 12/2223* (2013.01); *E04H 15/62* (2013.01); *F16M 11/041* (2013.01); *F16M 11/242* (2013.01); *F16M 11/28* (2013.01); *F16M 13/022* (2013.01); *F41B 5/1453* (2013.01); *F41J 1/10* (2013.01); *G03B 17/561* (2013.01); *F16M 2200/08* (2013.01)

(58) Field of Classification Search
CPC ........................................................ A45F 3/44
See application file for complete search history.

(56) References Cited

U.S. PATENT DOCUMENTS

| | | |
|---|---|---|
| 168,890 A | 10/1875 | Field |
| 345,877 A | 7/1886 | Brainard |
| | (Continued) | |

*Primary Examiner* — Amy Sterling
(74) *Attorney, Agent, or Firm* — Carrithers Law Office, PLLC

(57) ABSTRACT

A rotary mounting stand for removably holding a decoy, camera or there selected device upright on the ground. The stand includes an upright rod with a helical coil or flights forming an auger having a point at the lower distal end to be fixedly and removably screwed into the ground to support the stand in an upright position. The top end of the rod forming the stand shape cap configured, sized and shaped to correspond to the mounting base of a selected device to be supported on the stand. Just above the helical coil at least two outward extending legs extend normal to or perpendicular to the vertical rod forming a base when the auger portion is screwed into the ground. The distal end of each of the legs are bent or angled to extend upward perpendicular from the ground a selected distance forming handles for the purpose of rotating the auger into the ground. The auger is intended to be cranked until the at least two outward extending legs come to bear against the ground for increased lateral support.

24 Claims, 4 Drawing Sheets

Related U.S. Application Data is a continuation-in-part of application No. 13/998,981, filed on Dec. 30, 2013, now abandoned.

(51) Int. Cl.
*A01M 31/06* (2006.01)
*F41B 5/14* (2006.01)
*F41J 1/10* (2006.01)
*F16M 11/04* (2006.01)
*F16M 13/02* (2006.01)
*E04H 15/62* (2006.01)

(56) References Cited

U.S. PATENT DOCUMENTS

| | | | |
|---|---|---|---|
| 907,799 A | 12/1908 | Hawley | |
| 1,562,343 A | 11/1925 | Post | |
| 2,269,996 A | 1/1942 | Milton | |
| 2,447,444 A | 8/1948 | Waite | |
| 2,563,159 A | 8/1951 | Louis | |
| 2,901,789 A | 9/1959 | Frank | |
| 3,059,732 A | 10/1962 | Hammack | |
| 3,286,962 A | 11/1966 | Warth | |
| 3,318,560 A | 5/1967 | Garrette, Jr. et al. | |
| 3,688,454 A | 9/1972 | Wolfcarius | |
| 3,865,309 A | 2/1975 | Greenhalgh | |
| 4,607,608 A | 8/1986 | Allred et al. | |
| 4,928,418 A | 5/1990 | Stelly | |
| 5,098,057 A * | 3/1992 | Gran | E02D 5/801 248/156 |
| 6,401,656 B1 * | 6/2002 | Adkisson | A01K 5/0114 119/51.01 |
| 6,412,236 B1 | 7/2002 | Johnson | |
| 6,481,147 B2 | 11/2002 | Lindaman | |
| 6,487,977 B1 | 12/2002 | Williams et al. | |
| 6,698,132 B1 | 3/2004 | Brint | |
| 6,810,630 B2 | 11/2004 | Chizmas | |
| 6,901,693 B1 | 6/2005 | Crowe | |
| D550,071 S | 9/2007 | Powell | |
| 7,493,873 B2 | 2/2009 | Petersen | |
| 8,006,946 B2 | 8/2011 | Bonnema | |
| 8,230,638 B1 | 7/2012 | Dunaway | |
| 9,316,016 B2 * | 4/2016 | Brooks | E04H 12/2223 |
| 2005/0268522 A1 | 12/2005 | Foster | |

* cited by examiner

ROTARY GROUND AUGER BASE AND STAND FOR SUPPORTING ARTICLES

This application is a continuation in part of U.S. application Ser. No. 14/121,469 filed on Sep. 9, 2014 which is a continuation in part of U.S. application Ser. No. 13/998,981 filed on Dec. 30, 2013 and claims priority from U.S. Provisional Application Ser. No. 61/960,068 filed on Sep. 9, 2013 and U.S. Provisional Application Ser. No. 61/848,248 filed on Dec. 29, 2012 and U.S. Provisional Application Ser. No. 61/848,252 filed on Dec. 29, 2012 and U.S. Provisional Application Ser. No. 61/848,253 filed on Dec. 29, 2012 and U.S. Provisional Application Ser. No. 61/855,583 filed on May 28, 2013 all of which are incorporated by reference herein in their entirety.

TECHNICAL FIELD

The present invention relates to the field of mobile support stands.

BACKGROUND OF THE INVENTION

Duck, turkey, geese and other water fowl hunters often use decoys for attracting the fowl during hunting season. The decoys are typically displayed near or in the water and many are animated, that is, many decoys are provided with movable wings and heads which may or may not be motorized. Often times, decoys are attached to a pole, anchored, or supported by a stake which holds the decoy in a preferred position which is likely to attract ducks of targeted game animal. For instance, when duck hunting, the decoy may be held above the water so that the motion of the wings gives the appearance of a duck landing on the water. Therefore, it is a requirement that the stand which holds the duck be firmly secured to the ground. Some decoy stands have one or more spikes which are hammered into the ground with a hammer, rock, limb, or other tool; however, problems occur due to the inability to penetrate the earth, or the stand becoming loose due to wind and wear so that it falls over or the decoy spins around in an undesirable position.

Sportsman often look for stands to support targets for shooting or bow target practice, to hold cameras, or other camping and hunting equipment.

SUMMARY OF THE INVENTION

A rotary ground auger base and stand anchored to the ground for securely holding a removable or mounted decoy, camera or other selected device at a selected level above the ground. The stand comprises and/or consists of a base for resting on the ground having a vertical shaft or rod extending upward therefrom for holding supporting an object such as a decoy. A helical coil or flights forming a spiral extends below the base opposite the rod forming an auger having a point at the lower distal end which is be fixedly and removably screwed into the ground to support the stand in an upright position. The top end of the rod includes an adapter for cooperatively engaging a decoy or camera or other item to be mounted thereon. The supported item includes a base or receiver or adapter for cooperatively engaging the top portion of the stand support rod configured, sized and shaped to correspond to the mounting base of a selected device to be supported on the stand. The base comprises at least two outward extending opposing legs extending normal to or perpendicular to the vertical rod providing lateral support to the base when the auger portion is screwed into the ground. The distal end of each of the legs are bent or angled upwardly extending upward generally perpendicular to the ground a selected distance forming handles. The handles provide a leverage means for the purpose of rotating the auger into the ground. The auger is intended to be cranked or rotated until the outward extending legs of the base are generally horizontal to the ground and bear against the ground for increased lateral support.

The portable rotary ground auger base stand is designed for removably holding a decoy, camera or other selected device upright above the ground and anchoring the base within the ground to prevent the supported object from tipping over and to prevent the stand from twisting or rotating from the desired position during use. The stand includes an upright rod with a helical coil of helical flights of metal forming a ribbon coiled therearound having a point at the lower distal end to be fixedly and removably screwed into the ground to support the rod or stand in an upright vertical position. The top end of the rod forming the stand has an adapter such as a lug or cap configured, sized and shaped to correspond to the mounting base of a selected device to be supported on the stand. Examples of a lug configuration is a rod with threads, or a top hat configuration or a square ended rod for cooperative engagement with a receiver of a decoy or other object such as a camera adapter. The outward extending legs have upward extending handles at the free ends for the purpose of cranking the coil into the ground. The coil is intended to be cranked until the outward extending legs come to bear against the ground for increased lateral support. In one preferred embodiment the legs oppose one another; however it is contemplated that four legs or more may be used to comprise the base. At least two of the legs would include vertical arms for gripping to be used as handles for rotation of the auger into the ground.

The portable rotary ground auger base stand is designed for removably holding a decoy, camera or other selected device upright above the ground and anchoring the base within the ground to prevent the supported object from tipping over and to prevent the stand from twisting or rotating from the desired position during use. The decoy stake can be formed in one integral piece by bending a single length of rod or can be formed by welding, brazing or using other means of securing the individual members together. The lower rod portion includes an integral spiral auger extending from its distal end for anchoring the stake into the ground. The helical coil comprises a helix of a uniform diameter and a coil having a uniform diameter having a point extending therefrom extending downward from the axial base opposite the elongated vertical rod for cooperative engagement with the ground. The helical coil can be welded onto the end of a rod or fabricated by twisting the rod. The distal end of the rod typically includes a point for piecing the ground. It is also contemplated that portions of the decoy stake may be fabricated from carbon fiber, fiberglass, or even molded from high density plastic in an integral form or individual sections.

It is an object of this invention to provide a rotary ground auger base and stand for supporting a decoy/camera, wherein the stand includes a helical coil at one end which can be screwed into the ground.

It is an object of this invention to provide a rotary ground auger base and stand which includes an integral crank handle for the purpose of screwing the stand into the ground.

It is an object of this invention to provide a rotary ground auger base and stand which includes an integral crank handle for the purpose of screwing the stand into the ground and at least two laterally extending legs just above a helical coil so that when the coil is screwed completely into the ground, the legs come to bear on the ground.

It is an object of this invention to provide a rotary ground auger base and stand with a helical coiled at one end and an opposite end which is square for receiving a duck decoy.

It is an object of this invention to provide a rotary ground auger base and stand with a helical coil at one end and a crank handle which can be used to thread the coil into the ground, thus forming a rigid connection with the ground and providing secure support for a decoy.

It is an object of this invention to provide a rotary ground auger base and stand which also includes a loop for attaching a jerk line to the upper end of the decoy stand.

It is an object of this invention to provide a rotary ground auger base and stand threads at the top distal end of the support rod for cooperatively engaging a game camera.

It is an object of this invention to provide a rotary ground auger base and stand with a receiver at the top end for holding a standard camera wherein the receiver includes rod portion with ¼ inch by 20 threads and the rod portion is adjustably attached to the top end of the stand so that the camera may be held at any desired angle.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the views wherein.

DESCRIPTION OF THE PREFERRED EMBODIMENTS

In accordance with the present invention, there is provided a rotary ground auger base and stand 10 for holding a device or adapter in a raised position above the ground for the intended use.

Figure 1:
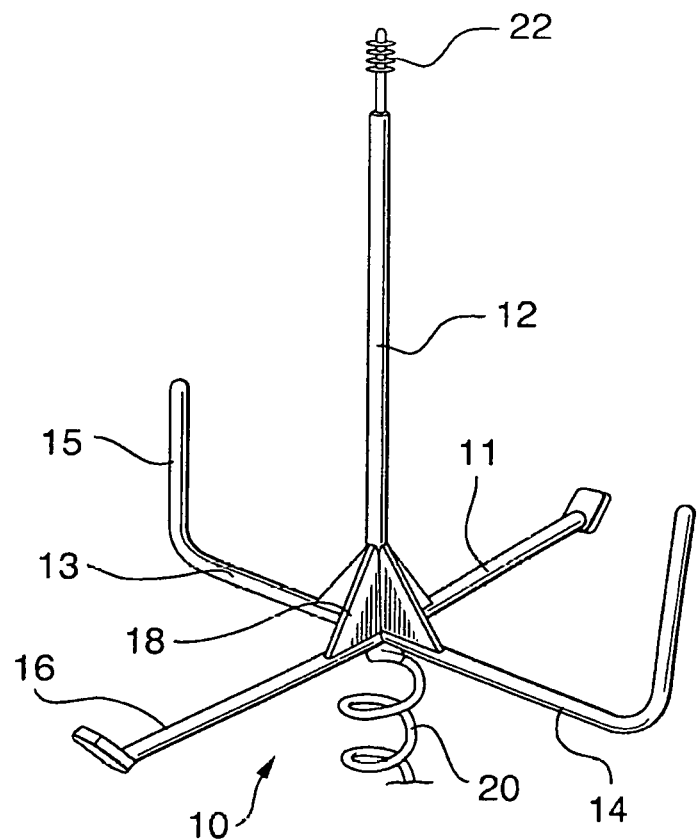
FIG. 1 is a perspective view of the rotary ground auger base and stand showing the spiral auger extending from the lower distal end of the vertical support rod with a plurality of lateral support legs disposed normal thereto above the spiral including upturned distal end portions forming handles.

As shown in FIG. 1, the rotary ground auger base and stand 10 comprises or consists of a base having legs extending therefrom. An elongated shaft 12 with a threaded distal top end 22 at the top extends from a vertical rod or shaft extending from the base which sets on the ground. An auger comprising a helical coil 20 extends from the bottom of the base and includes spaced apart opposing laterally extending legs 11, 13, 14 and 16 for providing additional lateral support by bracing the stand against the ground. Legs 13 and 14 are opposite one another as are legs 11 and 16. Legs 13 and 14 have upward extending arms 15 which are used as hand cranks to screw the helical coil 20 into the ground until the legs are in contact with the ground. As an option, the legs are braced against rod 12 by triangular shaped braces 18. It is contemplated that all of the legs include upwardly extending arms forming handles projecting from the distal ends of each leg; however, at least a pair of opposing legs are provided with arms for rotation of the auger into the ground.

Figure 2:
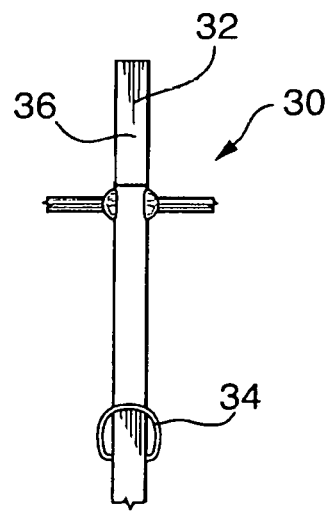
FIG. 2 is a front view of an alternative top end for the rotary ground auger base and stand.
Figure 3:
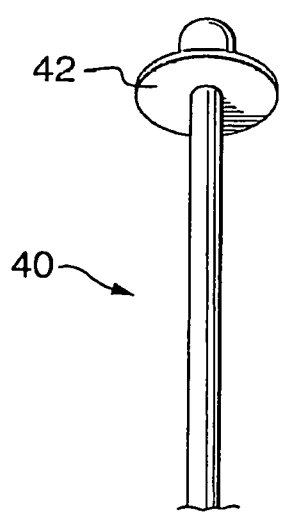
FIG. 3 is a front view of an alternative top end for the rotary ground auger base and stand.

FIGS. 2 and 3 show alternative distal mounting adapters 30. In FIG. 2, the top distal end of the rod is a square rod 32 with a locking hole 36 and a D-ring 34 for attaching a pull string and another having a 'top hat' of rounded head with a horizontal disc, which receive different types of decoys and cameras. FIG. 3 shows a top distal end 40 including a cap 42 arrangement for mounting a decoy, such as a turkey decoy thereon.

Figure 4:
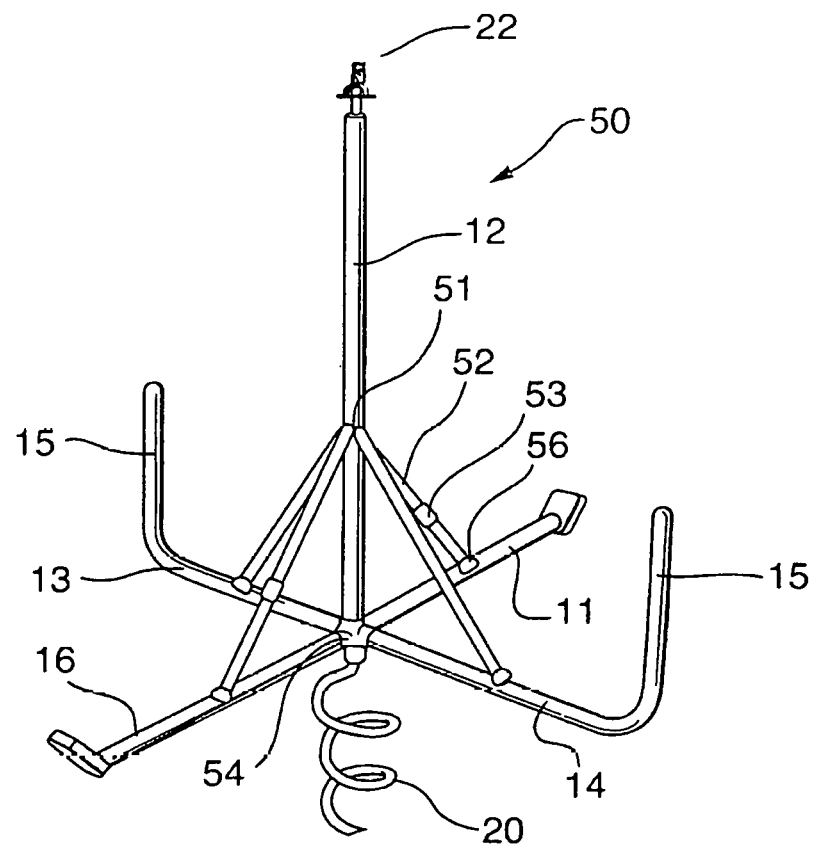
FIG. 4 is a perspective view of a rotary ground auger base and stand supported by a rotary auger having a vertical rod stand supported by a spiral auger and rigid or foldable rotary support legs including hinged brace legs providing a brace which can be folded for storage.

An alternative embodiment of the rotary ground auger base and stand 50 is shown in FIG. 4. The stand 50 includes two legs 14 and 16 that are foldable for storage. Triangular shaped braces comprise folding brace arms 52 which are hinged at the connecting point with the rod 12 by top hinge 51, by medial hinge 53 at the middle of the folding brace arms 52, and by base hinge 56 at the lateral legs 11 and 16 extending from the base. The legs 11 and 16 are hinged at the rod 12 just above the helical coil 20 by hinge 54 enabling the legs to be folded inwardly for packaging and transport or storage.

Figure 7:
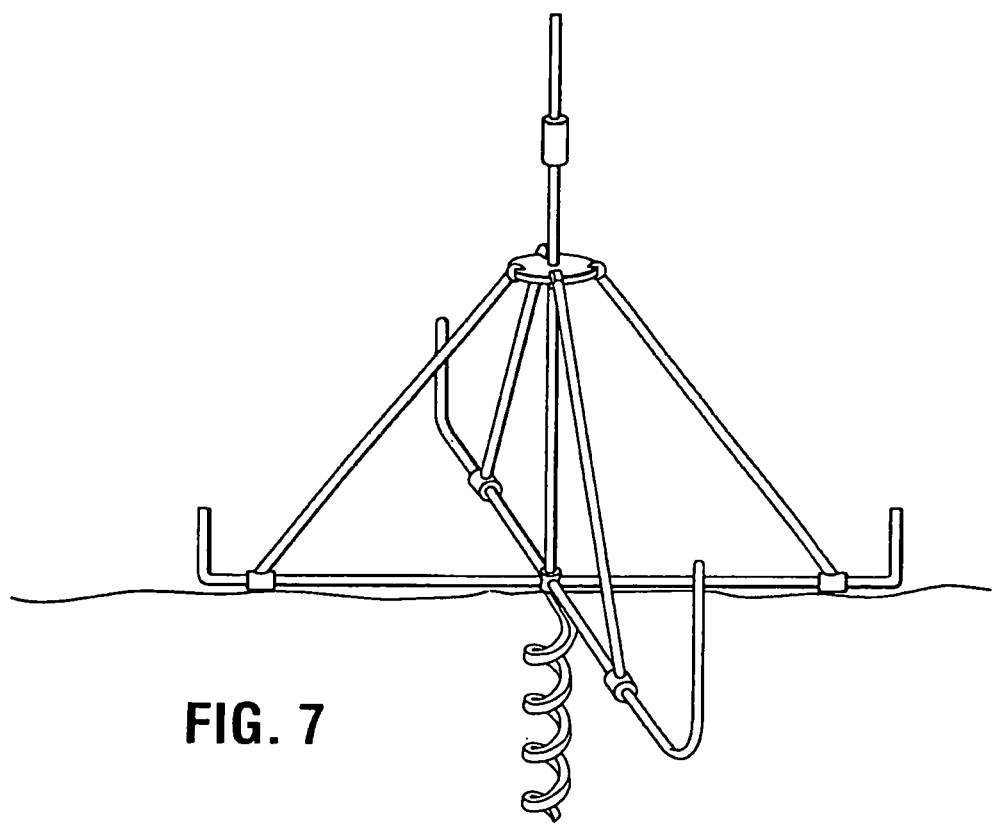
FIG. 7 is a perspective view of a rotary ground auger base and stand having a rotary auger and foldable rotary support legs including telescopic brace legs slidably attached to the vertical rod.
Figure 8:
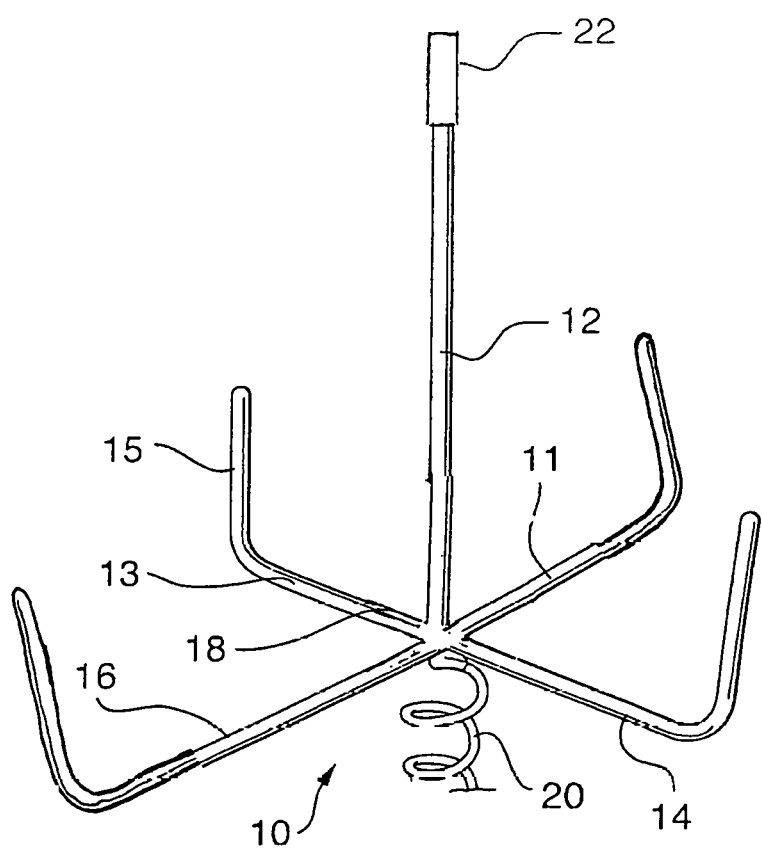
FIG. 8 is a perspective view of the rotary ground auger base and stand showing the spiral auger extending from the lower distal end of the vertical support rod including an adapter on the top distal end thereof and a plurality of lateral support legs disposed normal thereto forming a base above the spiral with the legs including upturned distal end arm portions forming handles.

Moreover, in an alternative embodiment, hinges 51 can be connected to a sliding cylinder or ring which allows the top end of the brace arms 51 to slide up and down the rod similar to the way an umbrella works as best illustrated in FIG. 7.

Still other alternative embodiments have two, three or more than four laterally extending legs for bracing but in any case, at least two of the legs includes an upward extending rod 15 at the free ends for screwing the helical coil 20 into the ground.

Figure 5:
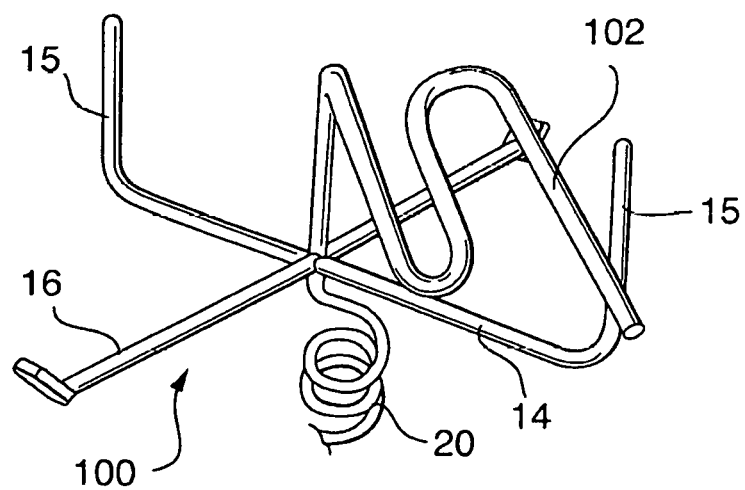
FIG. 5 is a front view of a archery bow stand supported by a spiral auger including lateral rotary support legs extended to form a base.

Another embodiment of the stand is a bow stand 100 shown in FIG. 5 which includes an "S-shaped" loop 102 extending from the top end of the rod for cooperatively engaging a longitudinal member such as the arm of a bow based between the loops to support the bow above the ground.

The rotary auger bow stand of FIG. 5 includes a medial portion comprising an elongated rod and a bottom portion comprising a helical spiral coil having a point extending downward from the elongated rod for a selected distance for penetration into the ground. The top portion defines a bow arm rest support comprising at least one curved "S" shaped loop portion extending upwardly from a top distal end of the elongated rod, the "S" shaped loop portion including a first straight section extending outwardly from the elongated rod at a selected angle from the top distal end of the elongated rod. A first curved end section extends from a distal end of the first straight section returning 180 degrees extending inwardly toward the elongated rod forming a second straight section spaced apart, parallel, and in alignment with the first straight section extending past the elongated rod. A second opposing curved end section returns 180 degrees extending inwardly forming a third straight section extending from the second opposing curved end section spaced apart, parallel, and in alignment with the first straight section and the second straight section.

Figure 6:
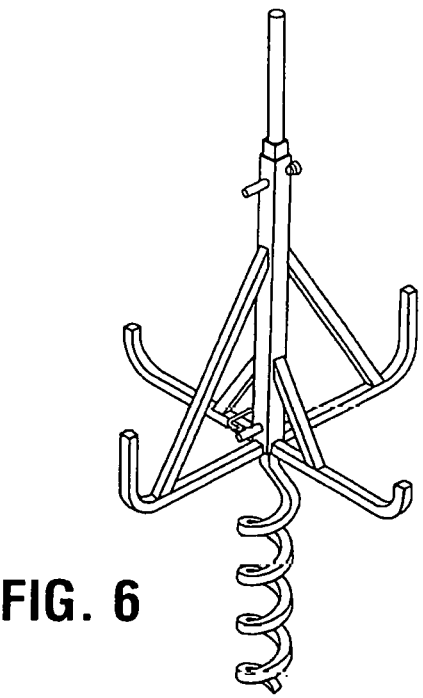
FIG. 6 is a perspective view of a rotary ground auger base and stand including a telescoping shaft having a plurality of coaxial rods disposed therein which can be extended and held in position at a selected height by a pin extending through corresponding holes formed in the shafts at selected locations.

The rotary ground auger base and stand shown in FIG. 6 includes a vertical telescoping shaft or rod extending upward from the base wherein a pin or spring loaded detent (ball and socket) is utilized to hold the shaft at an extended or collapsed condition.

As shown in FIG. 7, a lower portion of the rotary auger stand includes a longitudinal rod held within an adjustable tripod with a locking thumbscrew and a plurality of legs. The longitudinal rod has a helical coil at the lower end thereof. The rotary auger legs can be rigid wherein the tripod brace legs can be telescoping or slidably moved therealong into a selected bracing position. Moreover, the rotary auger legs may also be vertically hinged at the vertical support rod wherein the tripod brace legs can be used to lock the rotary legs in place providing a base with enhanced lateral support.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplification presented herein above. Rather, what is intended to be covered is within the spirit and scope of the appended claims.

I claim:

1. A rotary ground auger base and stand comprising:
   an axial base including a plurality of legs extending from said axial base spaced apart a selected distance from one another for supporting said base on the surface of the ground;
   a major portion of said plurality of legs extending from said axial base resting upon said ground providing lateral support to said axial base;
   at least two of said legs opposing one another including a distal end bent at an angle forming an arm extending upwardly from a distal end of thereof for a selected distance defining at least one handle;
   an elongated vertical rod extending upward from said axial base a selected distance;
   an auger comprising a helical coil comprising a helix of a uniform diameter and a coil having a uniform diameter having a point extending therefrom extending downward from said axial base opposite said elongated vertical rod for cooperative engagement with the ground;
   said auger integrally joined to or formed with said elongated vertical rod extending upward therefrom;
   means for mounting an object to be supported on said top distal end of said elongated vertical rod.

2. The rotary ground auger base and stand of claim 1 wherein means for mounting includes an adapter comprising a sleeve extending from a top distal end of said end of said elongated vertical rod.

3. The rotary ground auger base and stand of claim 1 wherein said means for mounting includes an adapter comprising a cap extending from a top distal end of said end of said elongated vertical rod.

4. A rotary auger base and stand for removably supporting a selected device, comprising:
   a base resting on the ground;
   said base including a vertical support rod extending upward therefrom including a distal end having means for cooperatively engaging and holding an object;
   said base including a helical coil defining an auger extending vertically downward opposing said vertical support rod, and said distal end of said helical coil forming a point;
   said base including a plurality of legs extending therefrom normal to said vertical support rod and said helical coil providing lateral support to said base;
   at least two of said extending legs in opposing relationship including a distal end angled upwardly at a selected angle of up to and including 90 degrees a selected distance from said base forming handles for rotating said auger into the ground until said opposing legs rest on the ground providing lateral support;
   said vertical support rod including at least one telescopic extension for supporting an article thereon; and
   means of bracing extending from said elongated vertical rod to at least two of said legs.

5. The rotary ground auger base and stand of claim 1, wherein said vertical support rod comprises an elongated vertical rod extending upward from said axial base a selected distance having a distal end for supporting a bow rest supporting section comprising a curved rod having at least one "S" shaped loop extending upwardly from a top distal end of said medial section comprising a rod having at least two opposing looped sections spaced apart from and in alignment with one another for receiving an arm of a bow, said at least two opposing looped sections including a first portion extending outwardly from said medial section at a right angle and a second portion extending upwardly over and spaced apart from and in alignment with said first portion forming a first curved loop extending past medial section a selected equal distance from said medial section and a third top portion extending upwardly over and spaced apart from and in alignment with said second portion forming a second curved portion extending a selected distance in alignment with said medial section.

6. The rotary ground auger base and stand of claim 5, wherein said bow rest supporting section includes a bent at a selected angle with respect to said shaft, said angle disposed parallel to said loops of said at least two opposing looped sections.

7. The rotary ground auger base and stand of claim 1, said vertical support rod including a telescopic extension for supporting an article thereon.

8. A rotary ground auger base and stand comprising:
   an axial base including a plurality of legs extending from said axial base spaced apart a selected distance from one another for supporting said base on the surface of the ground;
   at least two of said legs opposing one another including a distal end bent at an angle forming an arm extending upwardly from a distal end of thereof for a selected distance defining at least one handle;

an elongated vertical rod extending upward from said axial base a selected distance;

an auger comprising a helical coil extending downward from said axial base opposite said elongated vertical rod for cooperative engagement with the ground;

means for mounting an object to be supported on said top distal end of said elongated vertical rod; and means of bracing extending from said elongated vertical rod to at least two of said legs.

9. The rotary ground auger base and stand of claim 1, wherein said plurality of legs comprises at least four horizontal legs.

10. The rotary ground auger base and stand of claim 1, wherein said elongated vertical rod includes a threaded distal top end.

11. The rotary ground auger base and stand of claim 4, wherein said vertical support rod comprises an elongated vertical rod extending upward from said axial base a selected distance having a distal end for supporting a bow rest supporting section comprising a curved rod having at least one "S" shaped loop extending upwardly from a top distal end of said medial section comprising a rod having at least two opposing looped sections spaced apart from and in alignment with one another for receiving an arm of a bow, said at least two opposing looped sections including a first portion extending outwardly from said medial section at a right angle and a second portion extending upwardly over and spaced apart from and in alignment with said first portion forming a first curved loop extending past medial section a selected equal distance from said medial section and a third top portion extending upwardly over and spaced apart from and in alignment with said second portion forming a second curved portion extending a selected distance in alignment with said medial section.

12. The rotary ground auger base and stand of claim 11, wherein said bow rest supporting section includes a bent at a selected angle with respect to said shaft, said angle disposed parallel to said loops of said at least two opposing looped sections.

13. The rotary ground auger base and stand of claim 4, wherein said plurality of legs comprises at least four outwardly extending opposing legs.

14. The rotary ground auger base and stand of claim 4, wherein said distal end having means for cooperatively engaging and holding an object includes a threaded distal top end.

15. The rotary ground auger base and stand of claim 4 wherein said distal end having means for cooperatively engaging and holding an object includes an adapter comprising a sleeve extending from a top distal end of said end of said elongated vertical rod.

16. The rotary ground auger base and stand of claim 4 wherein said distal end having means for cooperatively engaging and holding an object includes an adapter comprising a cap extending from a top distal end of said end of said elongated vertical rod.

17. The rotary ground auger base and stand of claim 4 wherein said at least one telescopic extension for supporting an article thereon comprises at least two longitudinal members in coaxial sliding relationship.

18. The rotary ground auger base and stand of claim 17 wherein said at least one telescopic extension for supporting an article thereon comprises at least two longitudinal members in coaxial sliding relationship include at least one alignable aperture therethough normal to the longitudinal axis for holding a retaining pin therein to adjust the length of said two longitudinal members.

19. The rotary ground auger base and stand of claim 8 wherein said means for mounting includes an adapter comprising a cap extending from a top distal end of said end of said elongated vertical rod.

20. The rotary ground auger base and stand of claim 8, said vertical support rod including a telescopic extension for supporting an article thereon.

21. The rotary ground auger base and stand of claim 8, wherein said plurality of legs comprises at least four horizontal legs.

22. The rotary ground auger base and stand of claim 1, said legs including a hinged brace.

23. The rotary ground auger base and stand of claim 4, said legs including a hinged brace.

24. The rotary ground auger base and stand of claim 8, said legs including a hinged brace.

* * * * *